(12) United States Patent
Stipe et al.

(10) Patent No.: US 11,651,787 B2
(45) Date of Patent: May 16, 2023

(54) VCSEL ARRAY FOR HAMR

(71) Applicant: Western Digital Technologies, Inc., San Jose, CA (US)

(72) Inventors: Barry C. Stipe, San Jose, CA (US); Takuya Matsumoto, San Jose, CA (US); Sergei Sochava, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/684,139

(22) Filed: Mar. 1, 2022

(65) Prior Publication Data

US 2022/0189508 A1 Jun. 16, 2022

Related U.S. Application Data

(62) Division of application No. 16/908,270, filed on Jun. 22, 2020, now Pat. No. 11,302,352.

(51) Int. Cl.
*G11B 5/31* (2006.01)
*G11B 5/60* (2006.01)
(Continued)

(52) U.S. Cl.
CPC ............ *G11B 5/6088* (2013.01); *G11B 5/314* (2013.01); *G11B 5/3912* (2013.01);
(Continued)

(58) Field of Classification Search
None
See application file for complete search history.

(56) References Cited

U.S. PATENT DOCUMENTS 6,717,970 B2 4/2004 Marsh et al.
7,257,141 B2 8/2007 Chua
(Continued)

FOREIGN PATENT DOCUMENTS

CN 101937684 A 1/2011
CN 105895121 A 8/2016
(Continued)

OTHER PUBLICATIONS

Hussain et al. "Heat assisted magnetic recording (HAMR) with nano-aperture VCSELs for 10 Tb/in2 magnetic storage density," Proc. SPIE 8639, Vertical-Cavity Surface-Emitting Lasers XVII, Mar. 13, 2013, pp. 863909-1-863909-6, https://doi.org/10.1117/12.2002782.

(Continued)

*Primary Examiner* — Craig A. Renner
(74) *Attorney, Agent, or Firm* — Patterson + Sheridan, LLP; Steven H. VerSteeg

(57) ABSTRACT

The present disclosure relates to pretreating a magnetic recording head for magnetic media drive. For a heat assisted magnetic recording (HAMR) head, a light source provides the necessary heat for the drive to operation. A vertical cavity surface emitting laser (VCSEL) is mounted to a top surface of a slider. A plurality of laser beams are emitted from the bottom surface of the VCSEL and directed to a corresponding number of waveguide structures within the HAMR head. The waveguide structures feed into a multi-mode interference (MMI) device that then directs the laser into a single waveguide for focusing on a near field transducer (NFT). The VCSEL lasers are phase coherent and have no mode hopping.

19 Claims, 5 Drawing Sheets

(51) Int. Cl.
*G11B 5/48* (2006.01)
*G11B 5/39* (2006.01)
*G11B 5/00* (2006.01)

(52) U.S. Cl.
CPC .......... *G11B 5/4866* (2013.01); *G11B 5/6005* (2013.01); *G11B 2005/0021* (2013.01)

(56) References Cited

U.S. PATENT DOCUMENTS

| | | |
|---|---|---|
| 8,077,557 B1 | 12/2011 | Hu et al. |
| 8,107,326 B1 | 1/2012 | Hirano et al. |
| 8,139,448 B1 | 3/2012 | Hirano et al. |
| 8,179,747 B1 * | 5/2012 | Mugino et al. ........ G11B 5/314 360/59 |
| 8,259,539 B1 | 9/2012 | Hu et al. |
| 8,675,455 B1 | 3/2014 | Krichevsky et al. |
| 9,053,716 B1 | 6/2015 | Matsumoto et al. |
| 9,196,278 B1 | 11/2015 | Tatah et al. |
| 9,953,670 B1 | 4/2018 | Mu et al. |
| 10,061,088 B1 | 8/2018 | Peng |
| 10,892,603 B2 | 1/2021 | Huang et al. |
| 2002/0097765 A1 | 7/2002 | Marsh et al. |
| 2003/0113063 A1 | 6/2003 | Liu |
| 2011/0279903 A1 | 11/2011 | Wiedemann et al. |
| 2012/0008470 A1 * | 1/2012 | Shimazawa et al. .. G11B 5/314 369/13.24 |
| 2012/0113770 A1 | 5/2012 | Stipe |
| 2014/0185980 A1 | 7/2014 | Lei et al. |
| 2014/0192417 A1 | 7/2014 | Chann et al. |
| 2015/0340051 A1 | 11/2015 | Tatah et al. |
| 2018/0373114 A1 | 12/2018 | Tanaka |
| 2020/0287351 A1 | 9/2020 | Gerlach et al. |
| 2021/0398556 A1 | 12/2021 | Stipe et al. |
| 2021/0398557 A1 | 12/2021 | Stipe et al. |

FOREIGN PATENT DOCUMENTS

| | | |
|---|---|---|
| CN | 106297832 A | 1/2017 |
| JP | 2001168475 A | 6/2001 |
| JP | 2011060982 A | 3/2011 |
| JP | 2011086362 A | 4/2011 |
| JP | 2012069235 A | 4/2012 |
| JP | 2013140671 A | 7/2013 |

OTHER PUBLICATIONS

Shi et al. "Single-Mode Vertical-Cavity Surface-Emitting Laser Array With High Power and Narrow Far-Field Divergence Angle," IEEE Photonics Journal, vol. 5, No. 6, Dec. 2013, 1502508, DOI: 10.1109/JPHOT.2013.2287559, 9 pages.

Xun et al. "High-power in-Phase coherently coupled VCSEL array based proton implantation," Electronic Letters, Jul. 17, 2014, vol. 50, No. 15, pp. 1085-1086, DOI: 10.1049/el.2014.1298.

International Search Report and the Written Opinion for International Application No. PCT/US2021/033187 dated Aug. 3, 2021, 10 pages.

Bardinal et al. "Collective Micro-Optics Technologies for VCSEL Photonic Integration," Advances in Optical Technologies, 2011, vol. 2011, Article ID 609643, pp. 136-146.

Goto et al. "Near-Field Evanescent Wave Enhancement with Nanometer-Sized Metal Grating and Microlens Array in Parallel Optical Recording Head," Aug. 25, 2004, Japanese Journal of Applied Physics, vol. 43, No. 8B, DOI: 5814.10.1143/JJAP.43.5814.

Goto et al. "Microoptical Two-Dimensional Devices for the Optical Memory Head of an Ultrahigh Data Transfer Rate and Density Sytem Using a Vertical Cavity Surface Emitting Laser (VCSEL) Array," Jul. 2002, Japanese Journal of Applied Physics, vol. 41, No. 7S, Part 1, No. 7B, pp. 4835-4840.

* cited by examiner

VCSEL ARRAY FOR HAMR

CROSS-REFERENCE TO RELATED APPLICATIONS

This application is a divisional of co-pending U.S. patent application Ser. No. 16/908,270, filed Jun. 22, 2020, which is herein incorporated by reference.

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium.

HAMR typically utilizes an edge emitting laser diode (EELD) as the light source. There are a number of issues with EELD such as the need to mount a sub-mount to a slider which increases cost, mode-hops that can suddenly change recording power and reduce HAMR HDD capacity, small diameter output beams such that there is little alignment tolerance, intense optical mode at the facet which can lower reliability, necessity for burn-in during manufacturing which increases costs, and a high profile on the slider which increases disk-to-disk spacing.

Therefore, there is a need in the art for an improved HAMR magnetic media drive.

SUMMARY OF THE DISCLOSURE

The present disclosure relates to pretreating a magnetic recording head for magnetic media drive. For a heat assisted magnetic recording (HAMR) head, a light source provides the necessary heat for the drive to operation. A vertical cavity surface emitting laser (VCSEL) is mounted to a top surface of a slider. A plurality of laser beams are emitted from the bottom surface of the VCSEL and directed to a corresponding number of waveguide structures within the HAMR head. The waveguide structures feed into a multi-mode interference (MMI) device that then directs the laser into a single waveguide for focusing on a near field transducer (NFT). The VCSEL lasers are phase coherent and have no mode hopping.

In one embodiment, a vertical cavity surface emitting laser (VCSEL) device comprises: a chip for mounting on a slider, wherein the chip has a first surface for facing the slider; and a plurality of laser apertures disposed in the first surface, wherein the plurality of laser apertures are spaced apart by a pitch of between 2 microns and 10 microns, wherein the VCSEL device is capable of emitting a plurality of lasers corresponding to the plurality of laser apertures, and wherein the plurality of lasers operate at the same frequency, and wherein the plurality of laser apertures are linearly arranged.

In another embodiment, a magnetic recording head assembly comprises: a leading shield; a main pole; a near field transducer (NFT) coupled between the leading shield and the main pole; a waveguide structure coupled to the NFT, wherein the waveguide structure comprises: a first waveguide coupled to the NFT; a multimodal interference (MMI) device coupled to the first waveguide at a first end; and a plurality of second waveguides coupled to a second end opposite the first end of the MMI device, wherein the plurality of second waveguides extend from the MMI device to a top surface of the head assembly, wherein the top surface of the head assembly is opposite a media facing surface; and a vertical cavity surface emitting laser (VCSEL) device coupled to the top surface.

In another embodiment, a magnetic media drive comprises: a magnetic recording head, wherein the magnetic recording head comprises: a near field transducer (NFT) at a media facing surface (MFS); a waveguide structure extending between the NFT and a first surface opposite the MFS; and a vertical cavity surface emitting laser (VCSEL) device coupled to the first surface, wherein the VCSEL includes a second surface facing the first surface, wherein the VCSEL is capable of emitting a plurality of lasers through the second surface; and a magnetic media facing the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to pretreating a magnetic recording head for magnetic media drive. For a heat assisted magnetic recording (HAMR) head, a light source provides the necessary heat for the drive to operate. A vertical cavity surface emitting laser (VCSEL) is mounted to a top surface of a slider. A plurality of laser beams are emitted from the bottom surface of the VCSEL and directed to a corresponding number of waveguide structures within the HAMR head. The waveguide structures feed into a multimode interference (MMI) device that then directs the laser into a single waveguide for focusing on a near field transducer (NFT). The VCSEL lasers are phase coherent and have no mode hopping.

Figure 1:
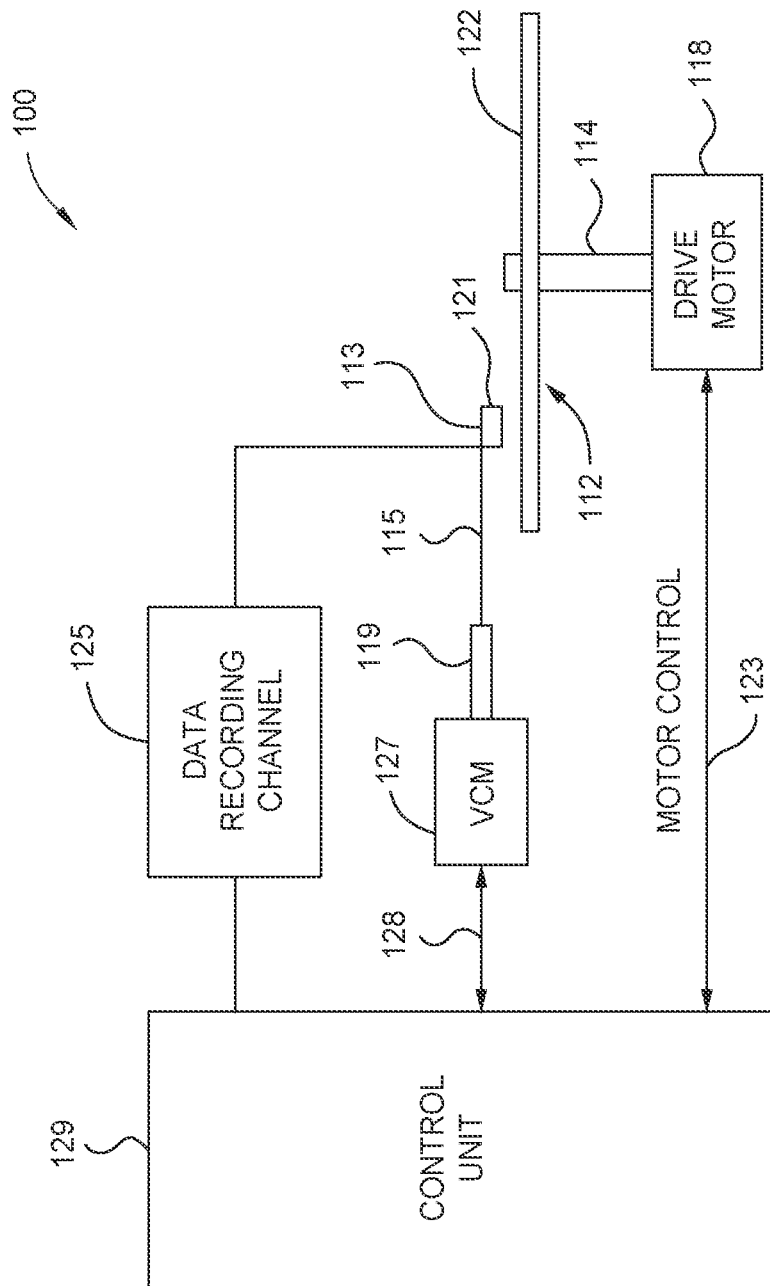
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
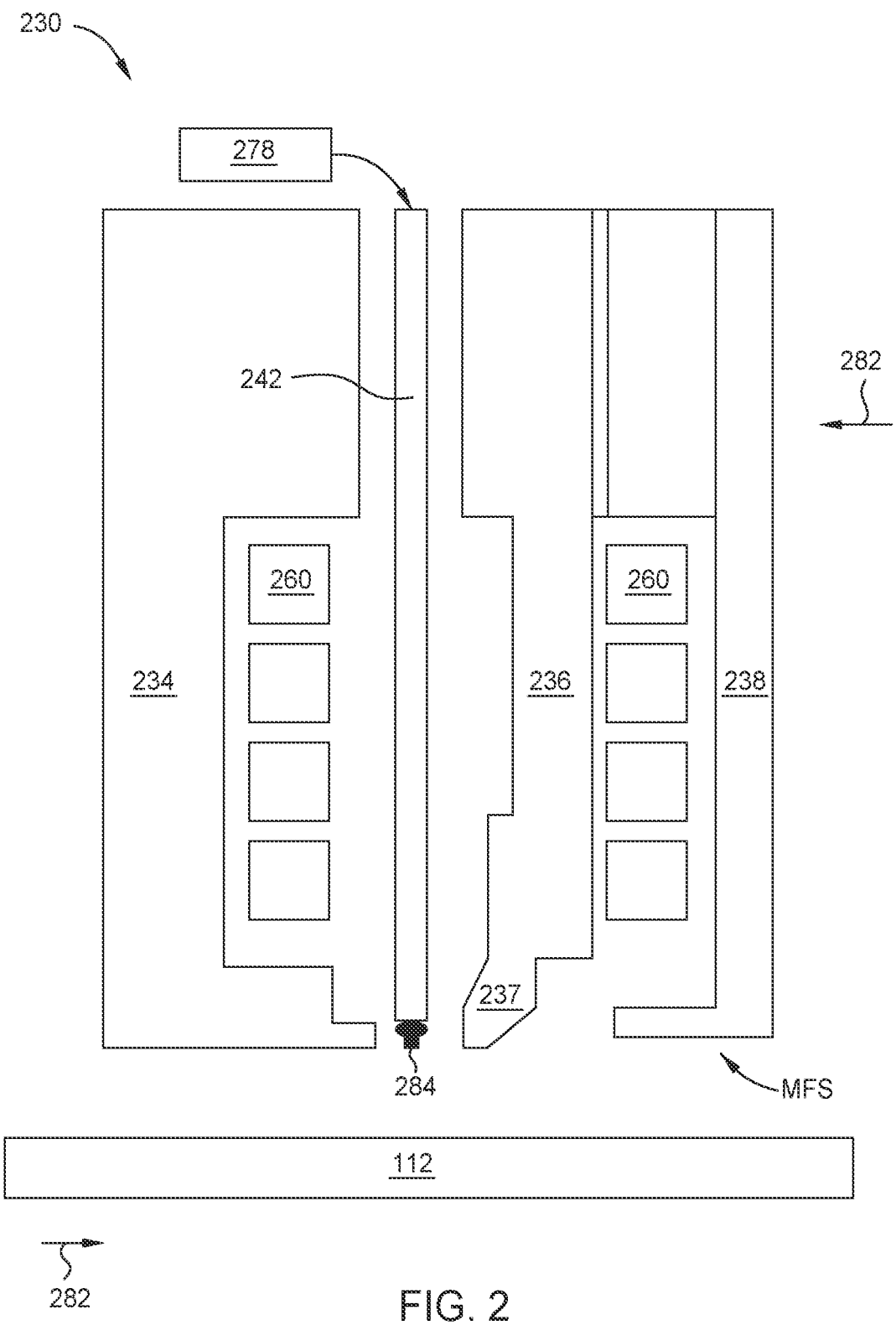
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return pole 234 and a trailing return pole 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading shield 234 and/or the trailing shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

Figure 3A:
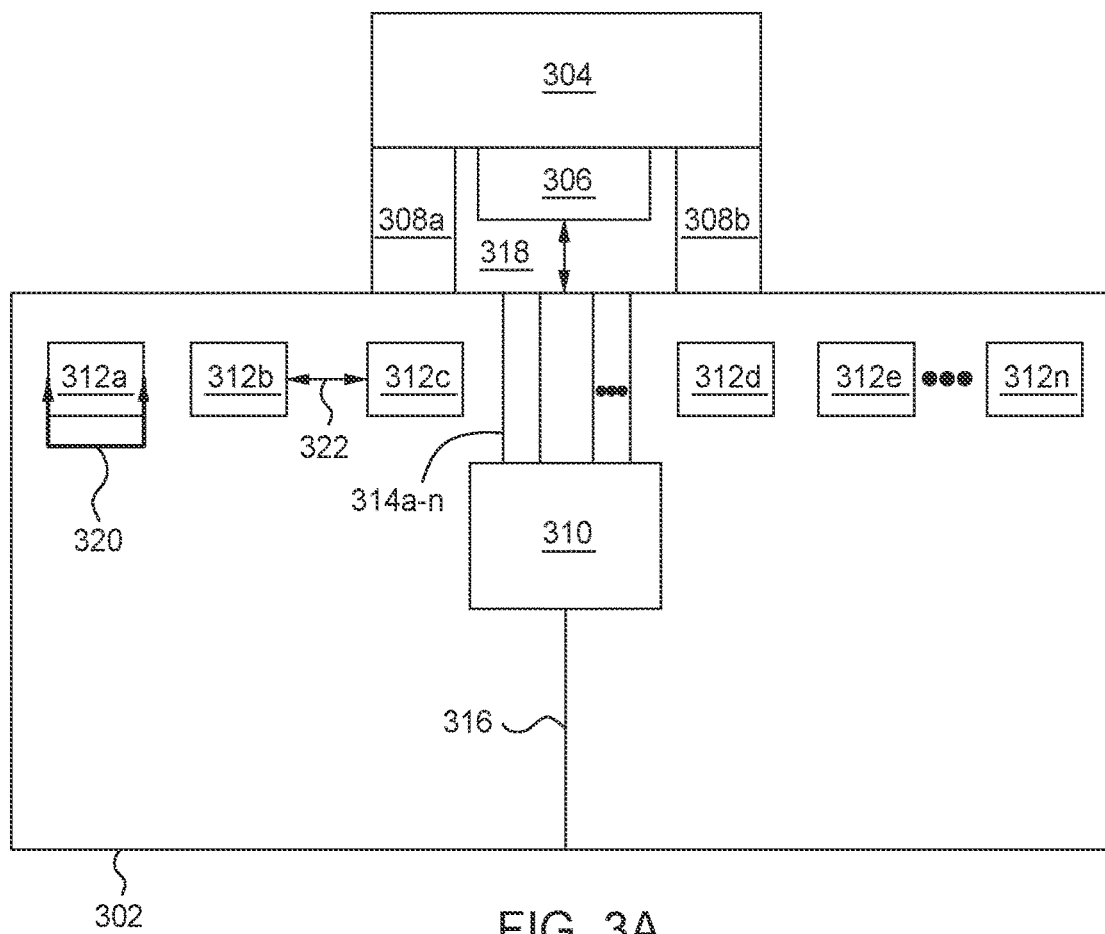
FIGS. 3A and 3B are schematic illustrations of a slider having a VCSEL mounted thereto according to one embodiment.
Figure 3B:
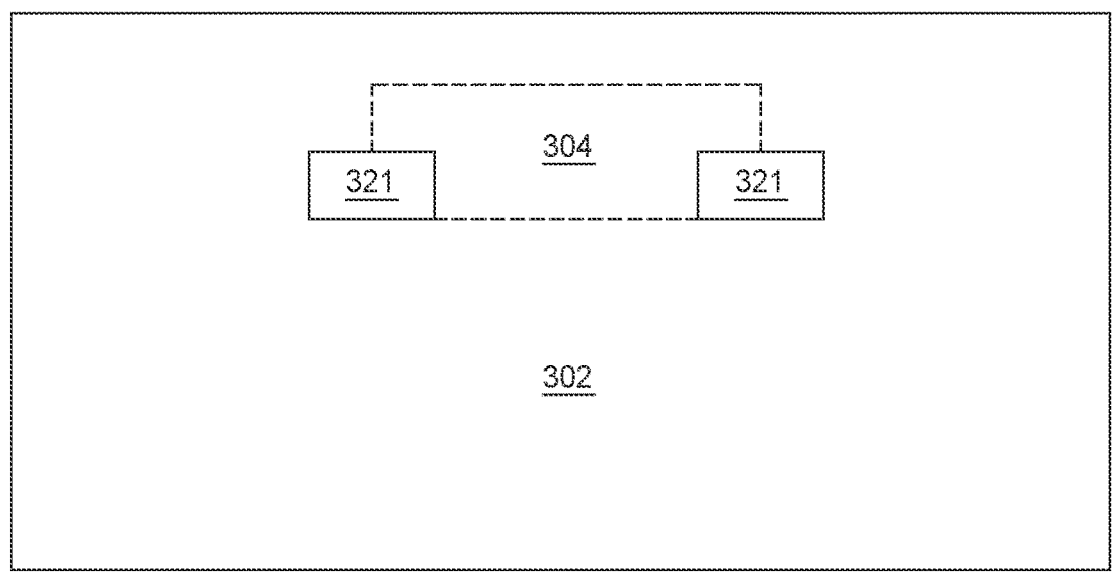

FIGS. 3A and 3B are schematic illustrations of a slider 302 having a VCSEL 304 mounted thereto according to one embodiment. The VCSEL 304 is mounted to the slider 302 via a first contact 308a and a second contact 308b in a first location as shown in FIG. 3B. In one embodiment, the VCSEL 304 is mounted on top of the slider 302, unlike an edge emitting laser diode (EELD) which typically needs to be first mounted to a sub-mount because it is difficult to bond the edge-emitting facet face of the laser directly to the top of the slider. The VCSEL 304 may have a minimal design structure, such that the dimensions of the VCSEL 304 may reduce the overall size of the HAMR write head. The VCSEL 304 includes a mesa 306 on a bottom surface of the VCSEL 304 facing the slider 302, where the mesa 306 is located between the VCSEL 304 and the slider 302. In FIG. 3B, the VCSEL 304 is shown in phantom to provide better visibility to the electrodes 321 on the top surface of the slider 302. The electrodes 321 provide the electrical connection, via an electrically conductive soldering material, to the electrodes of the VCSEL 304. The electrodes 321, the soldering material, and the electrodes of the VCSEL 304 collectively form the first contact 308a and the second contact 308b. The electrodes 321 extend above the slider 302 by a distance of between about 1 micron and about 3 microns.

The VCSEL 304 is capable of emitting a plurality of lasers that correspond to plurality of laser apertures of the mesa 306, where each of the plurality of lasers is aligned with the plurality of laser apertures (shown in FIG. 4C) of the mesa 306. Furthermore, the slider 302 includes a plurality of spot size converters 314a-314n that match the position and number of input lasers emitted by the VCSEL 304. The spot size converters 314a-314n extend from the top surface of the slider 302 facing the VCSEL 304. The mesa 306 is spaced from the top surface of the slider 302 by a first distance 318 of about 1 µm to about 20 µm. The mesa 306 includes a plurality of laser apertures, such as about 2 laser apertures to about 16 apertures. The previously listed values are not intended to be limiting, but to provide an example of an embodiment. The mesa is part of the VCSEL 304 chip and the apertures are on the surface of the mesa 306. The mesa 306 is an optional relief structure on the surface of the VCSEL 304.

The number of lasers mentioned above that the VCSEL 304 is capable of emitting matches the number of laser apertures of the mesa 306 as well as the number of spot size converters 314a-314n. Each laser, and hence each spot size converter 314a-314n is spaced apart by a second distance. The second distance between each of the spot size converters 314a-314n is about 2 µm to about 10 µm. Furthermore, each of the plurality of lasers emitted by the VCSEL 304 operates at the same frequency and are phase coherent. For example, adjacent apertures may be in-phase or out-of-phase with each other. Each laser of the plurality of lasers emitted by the VCSEL 304 has a power level of between about 1 mW to about 10 mW. The previously listed value is not intended to be limiting, but to provide an example of an embodiment. The plurality of lasers each has an active region (e.g., an area where the laser excited electrons). These active regions are spaced close enough to enable coupling and phase coherence to occur.

The slider 302 includes a plurality of bonding pad studs 312a-312n, such as about 2 bonding pad studs to about 32 bonding pad studs. The bonding pad studs 312a-312n have a first width 320 of about 25 µm, where the spacing 322 between adjacent bonding pad studs 312a-312n is about 32 µm. The previously listed values are not intended to be limiting, but to provide an example of an embodiment. The plurality of spot size converters 314a-314n are disposed at a location disposed between adjacent bonding pad studs 312a-312n. In the embodiment shown in FIG. 3A, the spot size converters 314a-314n are disposed between bonding pad studs 312c and 312d. Thus, in one example embodiment, all of the spot size converters 314a-314n need to fit within a linear distance of about 32 µm. Furthermore, the plurality of lasers, and hence, the plurality of spot size converters 314a-314n are linearly arranged. Each spot size converter 314a-314n is spaced about 2 µm to about 10 µm from the adjacent spot size converter 314a-314n.

The plurality of spot size converters 314a-314n feed into a multimode interference (MMI) device 310 that is disposed within the slider 302. The MMI device 310 combines the laser light fed from the output of the plurality of spot size converters 314a-314n at a first end, and emits a single laser through a single output waveguide 316. The single waveguide 316 emits laser light from the MMI device 310 that includes the combined power of the plurality of input lasers from the plurality of spot size converters 314a-314n accepted by the MMI device 310. The single output mode is needed to properly concentrate the optical power and couple to the NFT. Proper operation of the MMI typically requires stable phase coherence between the inputs.

Figure 4A:
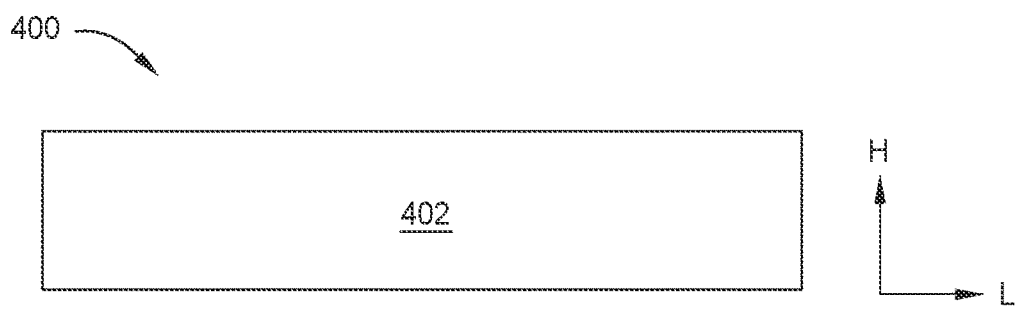
FIGS. 4A-4C are schematic illustrations of a VCSEL according to one embodiment.
Figure 4B:
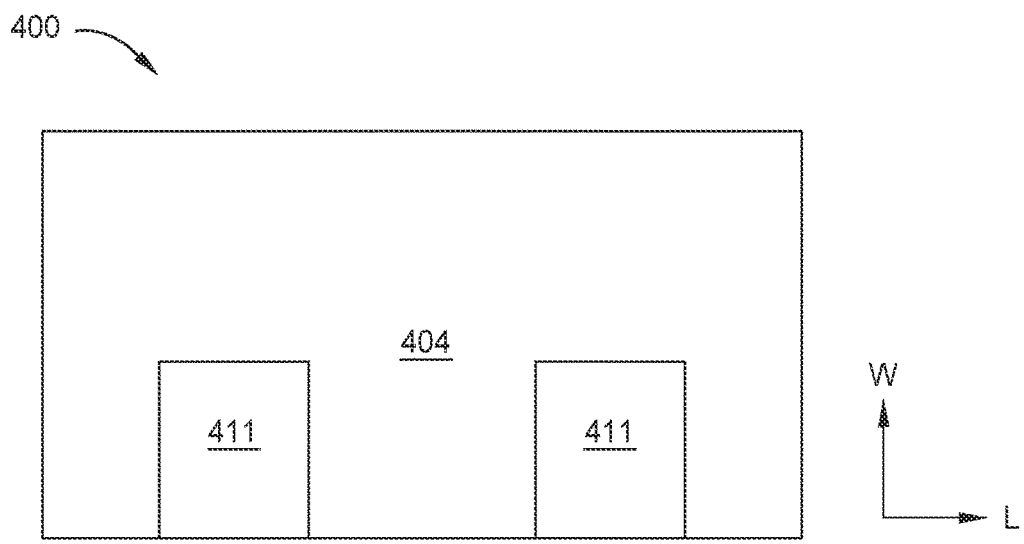
Figure 4C:
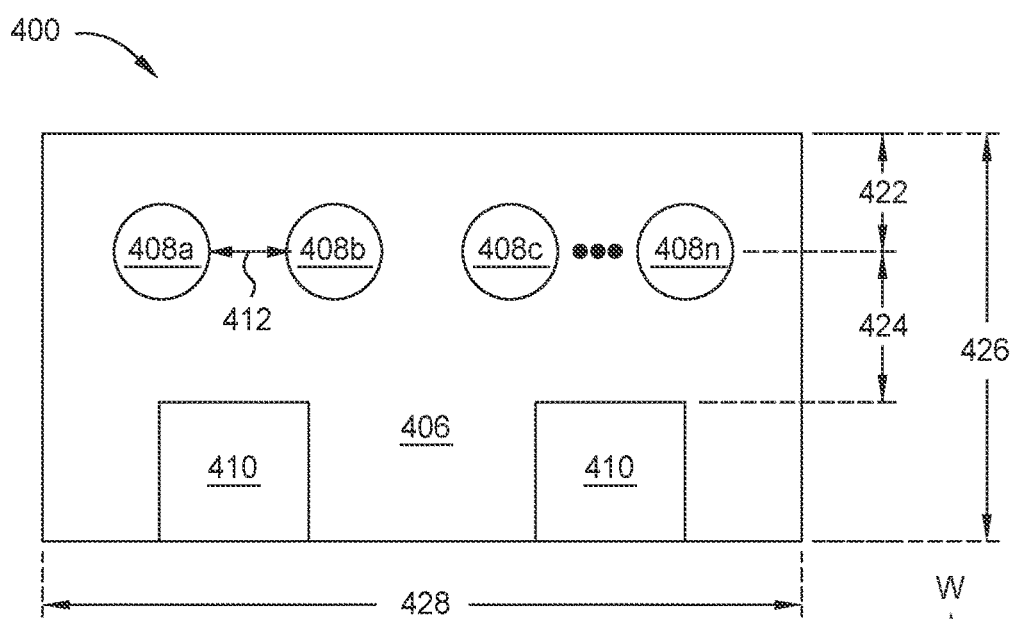

FIG. 4A is a schematic illustration of the side view of the VCSEL 400, FIG. 4B is a schematic illustration of the top view of the VCSEL 400, and FIG. 4C is a schematic illustration of the bottom view of the VCSEL 400 according to various embodiments. The side surface 402 of the VCSEL 400 includes a height (H) of about 75 µm to about 150 µm and a length (L) of about 100 µm to about 250 µm. The top surface 404 and the bottom surface 406 of the VCSEL 400 include the same dimensions. The dimensions of the top surface 404 and the bottom surface 406 include a width (W) of about 150 µm and a length of about 150 µm, where the length of the top surface 404, the bottom surface 406, and the side surface 402 are equal. The VCSEL 400 may have a plurality of electrodes 411 on the top surface 404 as shown in FIG. 4B, and they may be used to energize the VCSEL during active alignment before bonding.

In FIG. 4C, a plurality of laser apertures 408a-408n are disposed on the bottom surface 406 of the VCSEL 400. The number of laser apertures 408a-408n matches the number of spot size converters of the slider, such as the spot size converters 314a-314n of FIG. 3A. Each laser aperture 408a-408n is spaced by a distance 412 of about 2 μm to about 10 μm from the adjacent laser aperture 408a-408n. Furthermore, the laser apertures 408a-408n are aligned about a center line and each of the plurality laser apertures 408a-408n are aligned to a corresponding input laser. In addition to being aligned to each input laser, the laser apertures 408a-408n are aligned with a corresponding laser aperture of the mesa, such as the laser apertures of the mesa 306 of FIG. 3.

As shown in FIG. 4C, the bottom surface 406 of the VCSEL 400 has a plurality of electrodes 410 thereon to that function as anode and cathode, and mate with electrodes 321 of the slider 302 via soldering material. The electrodes 410 extend from the bottom surface 406 of the VCSEL 400 towards the slider for a distance of between about 1 micro and about 3 microns. Thus, in one embodiment, the gap between the VCSEL 400 and the slider 302 is between about 2 microns and about 6 microns. Additionally, the VCSEL 400 has a length 428 of between about 100 microns and about 200 microns. The VCSEL 400 also have a length 426 of between about 100 microns and about 200 microns. The apertures 408a-408n each have a diameter of between about 1.5 microns and about 8 microns and are on a 2 micron to 10 micron pitch. The center of the apertures 408a-408n are spaced from the side surface 402 by a distance 422 of between about 35 microns and about 50 microns. The center of the apertures 408a-408n are spaced from the electrodes 410 by a distance 424 of between about 75 microns and about 90 microns.

Figure 5:
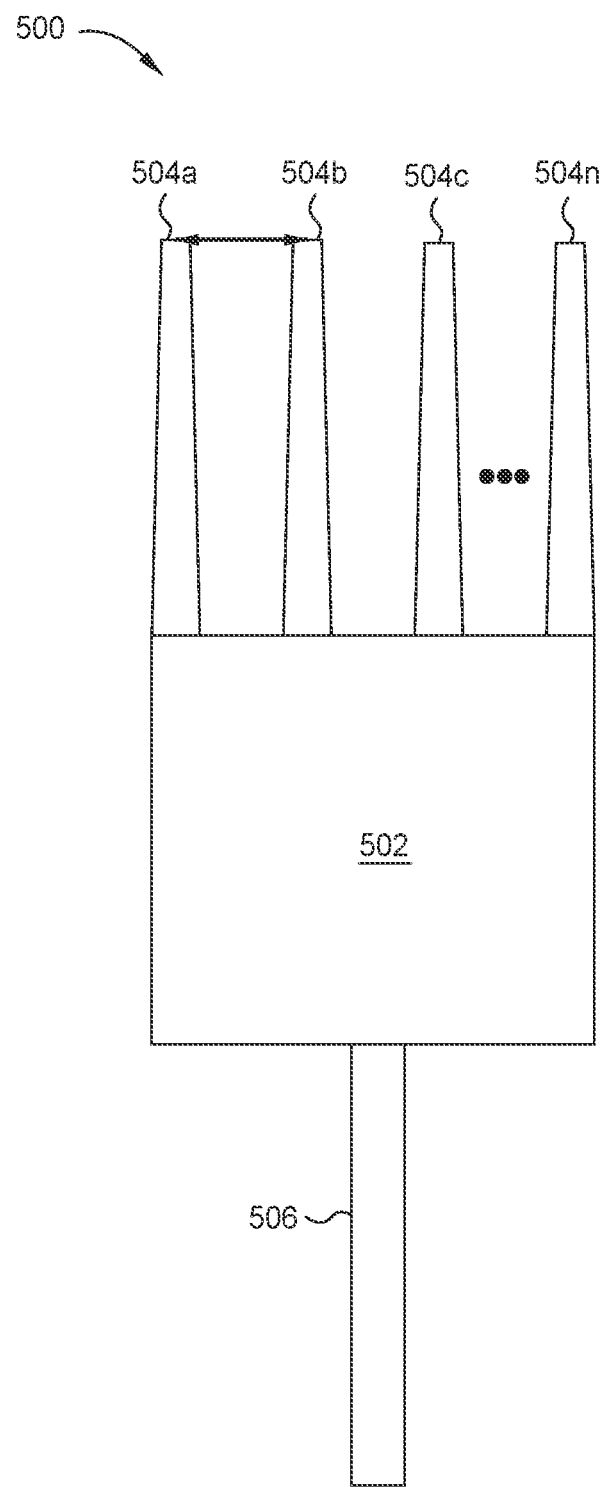
FIG. 5 is a schematic illustration of a waveguide structure of a HAMR head according to one embodiment.

FIG. 5 is a schematic illustration of a waveguide structure 500 of a HAMR head according to one embodiment. The slider, such as the slider 302 of FIG. 3, includes the waveguide structure 500 that includes a first spot size converter 506 that extends from the NFT to the MMI device 502. The waveguide structure 500 also includes a plurality of second spot size converters 504a-504n, such as about 2 second spot size converters to about 8 second spot size converters. The number of second spot size converters 504a-504n matches the number of laser apertures 408a-408n of the VCSEL 400 described in FIG. 4C, the number of laser apertures of the mesa 306 described in FIG. 3A, and the number of spot size converters 314a-314n described in FIG. 3A.

The plurality of second spot size converters 504a-504n fit within the spacing between the bonding pad studs, such as the bonding pad studs 312a-312n, such that the distance between the leftmost second spot size converter 504a and the rightmost second spot size converter 504n is less than the space of about 32 μm between the bonding pad studs. Furthermore, the plurality of laser apertures 408a-408n of the VCSEL described in FIG. 4C, the plurality of laser apertures of the mesa 306 described in FIG. 3A, and the plurality of emitted lasers, are each aligned with a corresponding second spot size converters 504a-504n.

As noted above, the waveguide structure 500 further includes a MMI device 502. The MMI device 502 may be the same as the MMI device 310 of FIG. 3. The first spot size converter 506 at a first end is coupled to the MMI device 502 at a first end and the plurality of second spot size converters 504a-504n at a second end are coupled to the MMI device 502 at a second end that is opposite of the first end of the MMI device 502. The first spot size converter 506, at a second end, is further coupled to a NFT, such as the NFT 284 of FIG. 2.

Furthermore, the core width of the second spot size converters 504a-504n gradually increases from about 150 nm to about 600 nm, along the direction towards the MMI device 502. At 150 nm, the spot size is matched to the large VCSEL mode size of a few microns. At 600 nm, the waveguide mode is only a few hundred nanometers before going into the MMI device 502.

VCSELs have a number of significant advantages for use as the light source in HAMR. The edge emitting laser diode (EELD) used today is typically mounted to a sub-mount because it is difficult to bond the edge-emitting facet face of the laser directly to the top of the slider. This sub-mount is then bonded to the slider. A VCSEL can easily have bonding electrodes on the surface-emitting face which match to corresponding electrodes on the top surface of the slider. These electrodes can be bonded together by laser-assisted solder reflow and can also serve as electrical connections for energizing the laser. By eliminating the need for a sub-mount, the light source cost can be significantly reduced. The VCSEL laser facet is made in a wafer level process which further lowers cost relative to EELDs. A VCSEL output beam is also larger and more circular than that of an EELD which increases the alignment tolerance and coupling efficiency to the slider spot size convertor. VCSELs are known to have higher reliability than EELDs due to larger, less intense optical mode and the wafer facet process. As a result, VCSELs do not require burn-in during manufacturing which further lowers cost. Since the VCSEL cavity length is shorter than EELDs, and because the laser is mounted on top of the slider, the lower overall height allows for a reduced disk-to-disk spacing, potentially more disks, and for higher HDD capacity.

Further, VCSELs have mode hop-free operation due to very short cavity length with one longitudinal mode and DBR mirror selectivity while EELDs suffer from mode hops. Mode hopping can cause a small (typically 1-2%) change in laser power to suddenly occur during the recording process. The possibility of a track width change and bit shift must be accounted for, which reduces the capacity of the HDD.

The primary technical issue with VCSELs is the relatively low output power relative to EELDs. Multimode VCSELs can have larger output power than single mode VCSELs but single mode operation is required by the waveguides and NFTs that are used to create the heat spot in the disk for HAMR. Single mode VCSELs typically have only about 2 mW of maximum output power, far short of the 10-20 mW needed for HAMR. The output cannot be efficiently increased by combining the outputs from multiple separate VCSELs because of decoherence between the wave fronts. If the active region of adjacent VCSELs are brought very close together, the wave functions will overlap enough to create coupling and phase coherence between their outputs. With the right VCSEL design and light delivery scheme, these outputs may be combined into a single waveguide with the necessary 5-10 mW of single mode power needed by the NFT for HAMR.

In one embodiment, a vertical cavity surface emitting laser (VCSEL) device comprises: a chip for mounting on a slider, wherein the chip has a first surface for facing the slider; and a plurality of laser apertures disposed in the first surface, wherein the plurality of laser apertures are spaced apart by a distance of between about 2 microns and about 10 microns, wherein the VCSEL device is capable of emitting a plurality of lasers corresponding to the plurality of laser apertures, wherein the plurality of lasers operate at the same frequency, and wherein the plurality of laser apertures are linearly arranged. The VCSEL device is capable of emitting a plurality of lasers that are phase coherent. The plurality of laser apertures includes 2-8 laser apertures. The VCSEL device is capable of emitting a plurality of lasers corresponding to the plurality of laser apertures, and wherein each laser of the plurality of lasers has a power level of between about 1 mW and about 10 mW. The first surface comprises a mesa and wherein the plurality of laser apertures are disposed in the mesa, wherein the plurality of laser apertures are spaced apart by a distance of between about 2 microns and about 10 microns. The VCSEL device further comprises a plurality of electrodes coupled to the first surface. The electrodes extend about 10 microns, and more preferably up to 2 microns from the first surface towards the slider. A magnetic media drive comprising the VCSEL device is also disclosed.

In another embodiment, a magnetic recording head assembly comprises: a leading shield; a main pole; a near field transducer (NFT) coupled between the leading shield and the main pole; a waveguide structure coupled to the NFT, wherein the waveguide structure comprises: a first waveguide coupled to the NFT; a multimodal interference (MMI) device coupled to the first waveguide at a first end; and a plurality of second waveguides coupled to a second end opposite the first end of the MMI device, wherein the plurality of second waveguides extend from the MMI device to a top surface of the head assembly, wherein the top surface of the head assembly is opposite a media facing surface; and a vertical cavity surface emitting laser (VCSEL) device coupled to the top surface. The VCSEL has a plurality of laser apertures that align with the plurality of second waveguides. The plurality of laser apertures are aligned with the plurality of second waveguides in a near field. The plurality of laser apertures are spaced from the top surface by a first distance of between about 1 microns to about 20 microns. The plurality of second waveguides comprises 2-16 second waveguides. A magnetic media drive comprising the magnetic recording head assembly is also disclosed.

In another embodiment, a magnetic media drive comprises: a magnetic recording head, wherein the magnetic recording head comprises: a near field transducer (NFT) at a media facing surface (MFS); a waveguide structure extending between the NFT and a first surface opposite the MFS; and a vertical cavity surface emitting laser (VCSEL) device coupled to the first surface, wherein the VCSEL includes a second surface facing the first surface, wherein the VCSEL is capable of emitting a plurality of lasers through the second surface; and a magnetic media facing the MFS. The second surface is spaced between about 1 microns and about 20 microns from the first surface. The waveguide structure has a width that is less than a width between adjacent electrodes of a slider upon which the magnetic recording head is disposed. The VCSEL is capable of emitting a plurality of lasers that are phase coherent. The waveguide structure comprises a multimodal interference (MMI) device that is disposed between the NFT and the first surface. The VCSEL is capable of emitting a plurality of lasers and wherein the plurality of lasers have active regions that at least partially overlap.

While the foregoing is directed to embodiments of the present disclosure, other and further embodiments of the disclosure may be devised without departing from the basic scope thereof, and the scope thereof is determined by the claims that follow.

What is claimed is:
1. A magnetic media drive, comprising:
a magnetic recording head, wherein the magnetic recording head comprises:
a near field transducer (NFT) at a media facing surface (MFS);
a waveguide structure extending between the NFT and a first surface opposite the MFS; and
a vertical cavity surface emitting laser (VCSEL) device coupled to the first surface, wherein the VCSEL device includes a second surface facing the first surface, wherein the VCSEL device is capable of emitting a plurality of lasers through the second surface that are phase coherent; and
a magnetic media facing the MFS.
2. The magnetic media drive of claim 1, wherein the second surface is spaced between about 1 microns and about 20 microns from the first surface.
3. The magnetic media drive of claim 1, wherein the waveguide structure has a width that is less than a width between adjacent electrodes of a slider upon which the magnetic recording head is disposed.
4. The magnetic media drive of claim 1, wherein the waveguide structure comprises a multimodal interference (MMI) device that is disposed between the NFT and the first surface.
5. The magnetic media drive of claim 1, wherein the plurality of lasers emitted by the VCSEL device have active regions that at least partially overlap.
6. The magnetic media drive of claim 1, wherein each laser of the plurality of lasers emitted by the VCSEL device has a power level of between about 1 mW and about 10 mW.
7. The magnetic media drive of claim 1, wherein the first surface comprises a plurality of laser apertures, the plurality of laser apertures aligning with the plurality of lasers emitted by the VCSEL device, wherein the plurality of laser apertures are spaced apart by a pitch of about 2 microns to about 5 microns.
8. A magnetic media drive, comprising:
a magnetic recording head, wherein the magnetic recording head comprises:
a near field transducer (NFT) at a media facing surface (MFS);
a waveguide structure extending between the NFT and a first surface opposite the MFS, wherein the waveguide structure comprises a multimodal interference (MMI) device that is disposed between the NFT and the first surface;
a plurality of laser apertures disposed in the first surface; and
a vertical cavity surface emitting laser (VCSEL) device coupled to the first surface, wherein the VCSEL device includes a second surface facing the first surface, wherein the VCSEL device is capable of emitting a plurality of lasers corresponding to the plurality of laser apertures, and wherein the plurality of lasers operate at a same frequency.
9. The magnetic media drive of claim 8, wherein the waveguide structure further comprises:
a first waveguide coupled between the NFT and a first end of the MMI device; and
a plurality of second waveguides coupled to a second end opposite the first end of the MMI device, wherein the plurality of second waveguides extend from the MMI device to the first surface, wherein the first waveguide emits laser light from the MMI device that includes a combined power of a plurality of input lasers from the plurality of second waveguides.

10. The magnetic media drive of claim 8, wherein the plurality of lasers emitted by the VCSEL device have active regions that at least partially overlap.

11. The magnetic media drive of claim 8, wherein the plurality of laser apertures are spaced apart by a pitch of about 2 microns to about 5 microns.

12. The magnetic media drive of claim 8, wherein the plurality of laser apertures includes 2-16 laser apertures.

13. The magnetic media drive of claim 8, wherein the plurality of laser apertures are spaced from the second surface by a first distance of between about 1 microns to about 20 microns.

14. The magnetic media drive of claim 8, wherein the plurality of lasers emitted by the VCSEL device are phase coherent, and wherein the plurality of laser apertures are linearly arranged.

15. A magnetic media drive, comprising:
a magnetic recording head, wherein the magnetic recording head comprises:
a near field transducer (NFT) at a media facing surface (MFS);
a vertical cavity surface emitting laser (VCSEL) device coupled to a first surface opposite the MFS, wherein the VCSEL device includes a second surface facing the first surface, wherein the VCSEL device is capable of emitting a plurality of lasers through the second surface, and wherein the plurality of lasers emitted by the VCSEL device are phase coherent; and
a waveguide structure extending between the NFT and the first surface, wherein the waveguide structure comprises means for combining a power of the plurality of lasers emitted by the VCSEL device.

16. The magnetic media drive of claim 15, wherein the plurality of lasers operate at a same frequency.

17. The magnetic media drive of claim 15, wherein the plurality of lasers emitted by the VCSEL device have active regions that at least partially overlap, and wherein each laser of the plurality of lasers emitted by the VCSEL device has a power level of between about 1 mW and about 10 mW.

18. The magnetic media drive of claim 15, wherein the VCSEL device is coupled to the first surface via one or more contacts, the one or more contacts each comprising one or more electrodes.

19. The magnetic media drive of claim 15, wherein the first surface comprises a plurality of laser apertures, the plurality of laser apertures aligning with the plurality of lasers emitted by the VCSEL device, wherein the plurality of laser apertures are spaced from the second surface by a first distance of between about 1 microns to about 20 microns.

* * * * *